US012665395B2

(12) United States Patent
Sheng et al.

(10) Patent No.: US 12,665,395 B2
(45) Date of Patent: Jun. 23, 2026

(54) GAS INSULATED SUBSTATION CABINET FOR PRECISE AIR SUPPLY CONTROL

(71) Applicant: Hangzhou Electric Power Design Institute Co. LTD, Hangzhou (CN)

(72) Inventors: Xueqing Sheng, Hangzhou (CN); Xianfeng Li, Hangzhou (CN); Weijun Huang, Hangzhou (CN); Xiaoyan Zhang, Hangzhou (CN); Chengang Hu, Hangzhou (CN); Su Xu, Hangzhou (CN); Lichuan Zheng, Hangzhou (CN); Zhenyu Gao, Hangzhou (CN); Jiahui Chen, Hangzhou (CN); Qiupei Zhou, Hangzhou (CN)

(73) Assignee: Hangzhou Electric Power Design Institute Co., LTD, Hangzhou (CN)

( * ) Notice: Subject to any disclaimer, the term of this patent is extended or adjusted under 35 U.S.C. 154(b) by 905 days.

(21) Appl. No.: 17/978,251

(22) Filed: Nov. 1, 2022

(65) Prior Publication Data

US 2023/0378726 A1      Nov. 23, 2023

(30) Foreign Application Priority Data

May 20, 2022     (CN) ........................ 202210558751.X

(51) Int. Cl.
*H02B 1/56* (2006.01)
*H02B 7/01* (2006.01)
(52) U.S. Cl.
CPC .............. *H02B 1/565* (2013.01); *H02B 7/01* (2013.01)

(58) Field of Classification Search
CPC ......... H02B 1/565; H02B 7/01; H02B 13/035
See application file for complete search history.

(56) References Cited

U.S. PATENT DOCUMENTS

| | | | |
|---|---|---|---|
| 3,364,838 A * | 1/1968 | Bradley ................. | A47B 81/00 |
| | | | 336/59 |
| 10,765,035 B2 * | 9/2020 | Cacho Alonso ....... | H05K 7/206 |
| 12,300,976 B2 * | 5/2025 | Inamasa ............. | H05K 7/20181 |
| 2021/0328396 A1 * | 10/2021 | Crighton ................ | H01R 35/04 |

* cited by examiner

*Primary Examiner* — Allen R. B. Schult
(74) *Attorney, Agent, or Firm* — COOPER LEGAL GROUP LLC

(57)                      ABSTRACT

Disclosed is a gas insulated substation cabinet for precise air supply control, comprising: cabinet doors arranged at one side of a cabinet body, a sealing mechanism arranged between a frame of the cabinet doors and a frame of the cabinet body, a supporting mechanism arranged in the cabinet body, a plurality of guiding mechanisms fixedly connected with the cabinet body inside along a vertical direction at equal intervals, electronic components respectively arranged in the guiding mechanisms, an air inlet device including a communicated pipeline, an air inlet mechanism on a top of communicated pipeline, an external air conditioner, and a filter mechanism at a bottom of the communicated pipeline, an air collecting device arranged at a bottom of an inner cavity of the cabinet and two air outlet devices respectively arranged on both sides of a bottom of the cabinet body.

9 Claims, 6 Drawing Sheets

GAS INSULATED SUBSTATION CABINET FOR PRECISE AIR SUPPLY CONTROL

CROSS-REFERENCE TO RELATED APPLICATIONS

This application claims priority to Chinese Patent Application No. 202210558751.X, filed on May 20, 2022, the contents of which are hereby incorporated by reference.

TECHNICAL FIELD

The application relates to the technical field of heat dissipation cabinets, and in particular to a gas insulated substation (GIS) cabinet for precise air supply control.

BACKGROUND

Gas insulated substation (GIS) is the abbreviation of gas insulated totally enclosed electric substation, which combines the primary equipment except the main transformer in a substation into a whole. Because of the large space and concentrated equipment in a GIS room, a ventilation system of the GIS room easily has problems such as large temperature gradients, local heat accumulation, unreasonable air distribution etc., so maintenance personnel need to patrol GIS room frequently. Excessively high indoor temperatures not only impair the accuracy of measurement and control instruments, but also pose a great threat to the physical and mental health of staffs. At present, there is still a lack of systematic research on the ventilation and heat dissipation of GIS rooms. In engineering practice, the parameters of ventilation system are generally estimated based on air exchange rates or according to experience. Substations are faced with great heat dissipation pressure while running, which often leads to indoor temperatures exceeding 40° C. in summer. Due to many environmental problems, it is necessary to take appropriate technical or engineering measures to control the working environment temperature of equipment and components to ensure the normal operation of electrical equipment.

According to relevant design specifications, natural ventilation should be the first choice in substation ventilation design in areas where conditions are met. Although having many advantages, the ventilation effect of natural ventilation is easily affected by weather conditions and building structures, especially in hot summer, when the inlet air temperature rises, heat dissipation capacity of substations decreases, and the rooms with excessive heat, such as the main transformer room, are facing severe pressure, and the indoor temperature exceeds 40° C. for a long time, which poses a threat to the safe operation of equipment and the health of maintenance personnel. In order to enhance the ventilation and heat dissipation performance, it is often necessary to add a mechanical air inlet device or a mechanical air exhaust device to speed up the indoor air flow and improve the heat exchange efficiency.

Mechanical air inlet and mechanical air exhaust are least affected by environmental conditions, indoor air flows fast, and can overcome the flow resistance to the greatest extent. Theoretically, mechanical air inlet and exhaust equipment has the strongest heat dissipation capacity. However, chaotic airflow distribution of mechanical air inlet and exhaust leads to high-cost investment and maintenance, noisy running, and the long-term operation is likely to lead to the damage of fan blades and other faults, and the workload of maintenance personnel increase as well, so the construction requirements of "resource-saving and environment-friendly" substations are not met, the use of mechanical air inlet and exhaust is only considered in some extreme environments.

Due to the negative pressure in the room caused by mechanical exhaust, dust is easily sucked into the room from the natural air inlet and accumulated on the surface of the radiator and the insulator, which degrades the heat dissipation performance of the transformer over time and even lead to pollution accidents of insulators. At the same time, the operating noise of the cabinet centrifuge exceeds 90d B(A), and the exhaust fan is located on the open roof around, so the noise generated by mechanical exhaust is easy to spread to the nearby residential areas, resulting in noise pollution. Therefore, it is necessary to reduce the noise pollution generated by the fan by adding mufflers, static pressure boxes and replacing muffling shutters. Therefore, negative pressure ventilation is not recommended to be adopted for a long time.

Mechanical air inlet and natural air exhaust is an effective means of ventilation and heat dissipation, and it is also the most widely used system at present. The location of mechanical air supply outlet has obvious influence on the temperature distribution of main transformer room. At present, the mechanical air inlet device is mainly set at the bottom of the room, so placing an air inlet directly below the transformer and equipping with guide vanes mostly is a way to effectively utilize the low-temperature inlet air. However, this method has several problems: the cold air flow is prone to short flow, and flows out of the room directly from the air outlet along the wall; for the convenience of operation, the heating elements in GIS cabinets are mostly located at the upper part of the cabinet, and the cold air can't immediately contact and exchange heat after entering the cabinet, resulting in heat waste; the flow velocity in the air supply duct and the cabinet is different. Because the cabinet is large, the flow velocity of cold air obviously decreases, and the electric heating element is prone to condensation.

Therefore, it is urgent to have a GIS cabinet for precise air supply control to solve the above problems.

SUMMARY

The objective of the application is to provide a gas insulated substation (GIS) cabinet for precise air supply control, so as to solve the problems existing in the prior art.

In order to achieve the above objective, the present application provides the following scheme. The present application provides a GIS cabinet for precise air supply control, including:

a cabinet body, where cabinet doors are arranged on one side of the cabinet body, a sealing mechanism is arranged between a frame of the cabinet doors and a frame of cabinet body, a supporting mechanism is arranged in the cabinet body, a plurality of guiding mechanisms are fixedly connected with the cabinet body inside at equal intervals along a vertical direction, different electronic components are respectively arranged in the guiding mechanisms, and the guiding mechanisms and the electronic components are connected with the supporting mechanism by bolts;

an air inlet device, where the air inlet device includes a communicated pipeline, a top of the communicated pipeline is provided with an air inlet mechanism, a bottom of the air inlet mechanism is communicated with the top of the communicated pipeline, the air inlet mechanism is communicated with an external air conditioner, and a bottom of the communicated pipeline is provided with a filter mechanism;

an air collecting device arranged at a bottom of an inner cavity of the cabinet body;

two air outlet devices respectively arranged on both sides of a bottom of the cabinet body.

Optionally, the air inlet mechanism includes an air inlet pipeline, one end of the air inlet pipeline is sleeved outside the communicated pipeline, an outer wall of the air outlet end of the air inlet pipeline is fixedly connected with a fixing ring, and an outer wall of a top of the cabinet body is fixedly connected with a connecting ring matched with the fixing ring, and the fixing ring is connected with the connecting ring by bolts, and the other end of the air inlet pipeline is communicated with the external air conditioner.

Optionally, a sealant is arranged between the fixing ring and the connecting ring.

Optionally, the filter mechanism includes a filter cylinder, a top of the filter cylinder is fixedly connected to an outer wall of a top opening of the inner cavity of the cabinet body, an inner wall of the filter cylinder is fixedly connected with a filter screen, a bottom of the filter cylinder is detachably connected with a first louver, and the first louver is arranged as an Acrylonitrile Butadiene Styrene (ABS) anti-condensation double-layer adjustable louver.

Optionally, the air collecting device includes an air collecting plate, a side wall of the air collecting plate is fixedly connected with an inner wall of the cabinet body, a top surface of the air collecting plate is provided with an air collecting hole, and a bottom surface of the air collecting plate is fixedly connected with an air collecting pump, and the air collecting pump is communicated with the air collecting hole.

Optionally, air outlet devices include second louvers, two sides of the bottom of the cabinet body are respectively provided with an air outlet hole, the second louvers are fixedly connected to inner walls of the air outlet holes, and the second louvers are configured as sealable louvers.

Optionally, the supporting mechanism includes a plurality of horizontal supports, a plurality of horizontal supports are fixedly connected to two opposite inner walls of the cabinet body at equal intervals in a vertical direction, and lateral surfaces of the horizontal supports located on a same side are connected with vertical supports by bolts, and the guiding mechanisms and the electronic components are respectively connected with the vertical supports by threads, and a plurality of threaded holes are respectively provided on the horizontal supports and the vertical supports.

Optionally, each guiding mechanism includes a bidirectional air deflector and a directional fan, where both ends of the bidirectional air deflector are detachably connected with two vertical supports by bolts; both ends of the directional fan are detachably connected with the two vertical supports by bolts; the directional fan is located below the bidirectional air deflector; the electronic components are arranged between the directional fan and the bidirectional air deflector; and circuit boards on the electronic components are detachably connected with the two vertical supports by bolts.

Optionally, an outer wall of each bidirectional air deflector is designed as a frosted surface, and thermal conductive silicone pads are also set between the circuit boards of the electronic components and the vertical supports.

Optionally, the sealing mechanism includes a rubber tube, a side wall of the frame of the cabinet body is provided with an annular groove in a rectangular structure, the rubber tube is arranged in the annular groove, the rubber tube is arranged in an annular structure, an inner wall of the top of the cabinet body is fixedly connected with a sealing air pump, the sealing air pump is communicated with the rubber tube, and an outer wall of the rubber tube at the bottom of the cabinet body is communicated with an air outlet pipe. The air outlet pipe penetrates through an inner wall of the annular groove and is communicated with the inner cavity of the cabinet body, the aperture of the air outlet pipe is far smaller than that of the communicating part of the sealing air pump and the rubber pipe, and sides of each cabinet door is fixedly connected with a sealing ring matched with the annular groove.

The application discloses the following technical effects. By changing the mechanical air supply direction, air is supplied from an upper part of the GIS cabinet, and cold air delivered directly contacts the electronic components generating more heat, so that the heat loss is reduced and cold air is not prone to short flow. When entering the cabinet from an air supply outlet, the cold air keeps a high flow rate to avoid dew condensation. Through upper air inlet and lower air exhaust, the temperature of electronic components in the cabinet is quickly reduced by convection heat transfer under the condition that the temperature in the cabinet is too high, and dew condensation is prevented, thus reducing the running time of the air conditioner in the state of high energy consumption and ensuring the safe and stable operation of the equipment in the cabinet. The air inlet device is communicated with the indoor side air outlet window of the air conditioning unit, and the air outlet devices directly lead to the room. The air outlet devices have a function of preventing mosquitoes and other small animals from entering. The electronic components are merging unit, bus intelligent terminal, bus measurement and control and other components. The circuit boards of the electronic components are arranged at intervals along the vertical direction, and positions of circuit boards may be adjusted along the vertical direction, and the electronic components are respectively installed on the supporting mechanism by bolts, so that the circuit boards are suspended and the heat dissipation effect is enhanced. The air collecting device makes the air in the cabinet circulate more quickly, and makes the heat generated by electronic components dissipate quickly.

BRIEF DESCRIPTION OF THE DRAWINGS

In order to more clearly explain the embodiments of the present application or the technical solutions in the prior art, the following will briefly introduce the drawings to be used in the embodiments. Obviously, the drawings in the following description are only some embodiments of the present application. For those of ordinary skill in the art, other drawings may be obtained according to these drawings without any creative efforts.

DETAILED DESCRIPTION OF THE EMBODIMENTS

The technical solutions in the embodiments of the present application will be clearly and completely described below with reference to the drawings in the embodiments of the present application. Obviously, the described embodiments are only part of the embodiments of the present application, but not all of them. Based on the embodiment of the present application, all other embodiments obtained by ordinary technicians in the field without creative labor are within the scope of the present application.

In order to make the above objectives, features and advantages of the present application more obvious and understandable, the present application will be explained in further detail below with reference to the drawings and detailed description.

Figure 1:
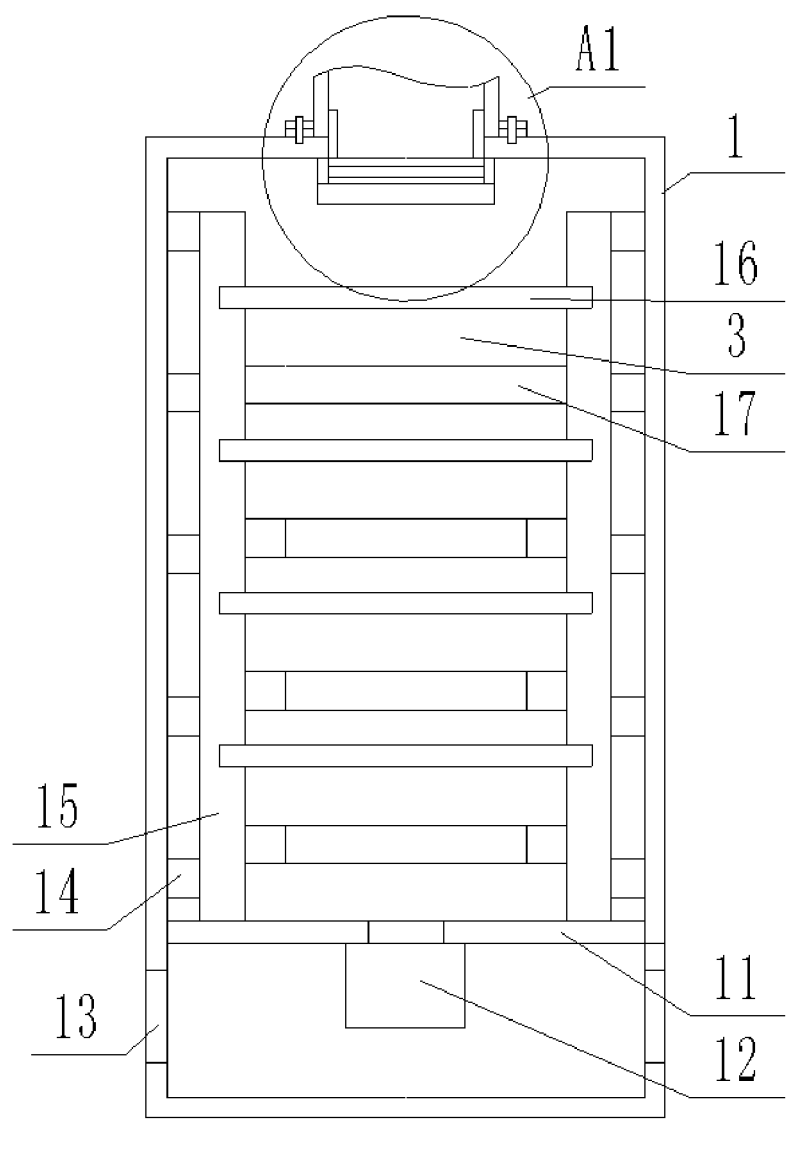
FIG. 1 is a schematic structural diagram of a gas insulated substation (GIS) cabinet for precise air supply control according to the present application.
Figure 2:
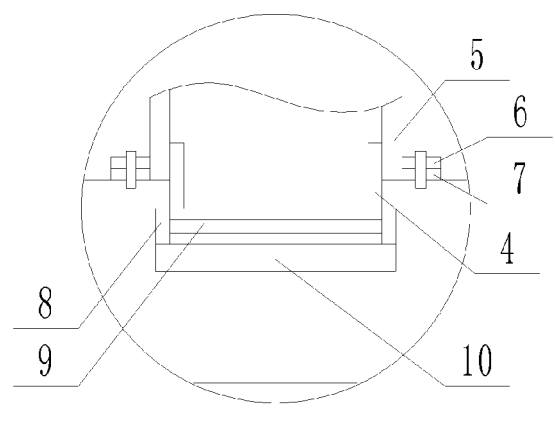
FIG. 2 is a partial enlarged view of A1 in FIG. 1.
Figure 3:
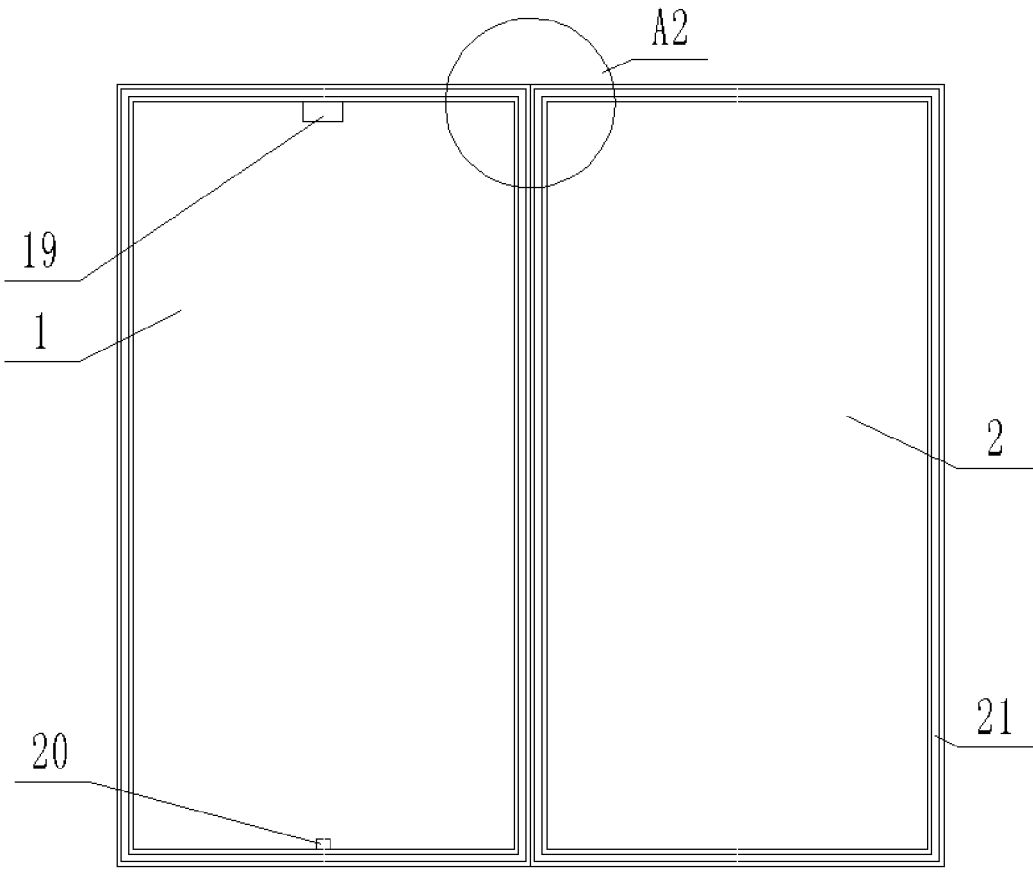
FIG. 3 is a schematic structural diagram of a sealing mechanism in the present application.
Figure 4:
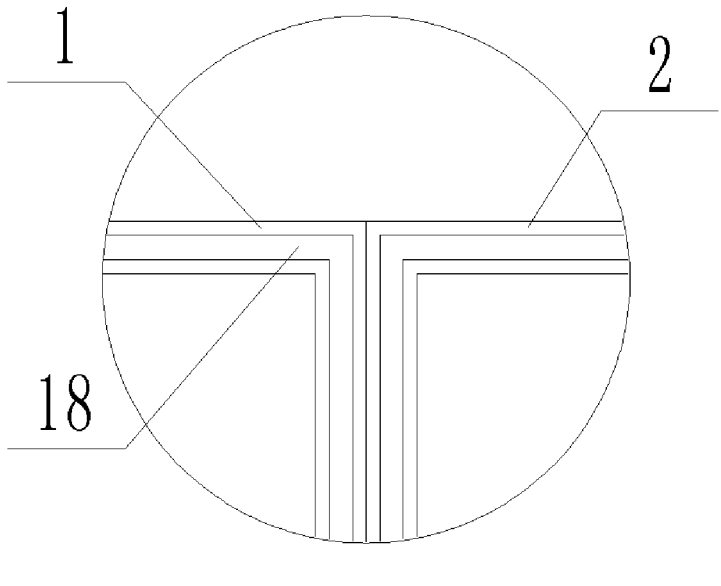
FIG. 4 is a partial enlarged view of A2 in FIG. 1.
Figure 5:
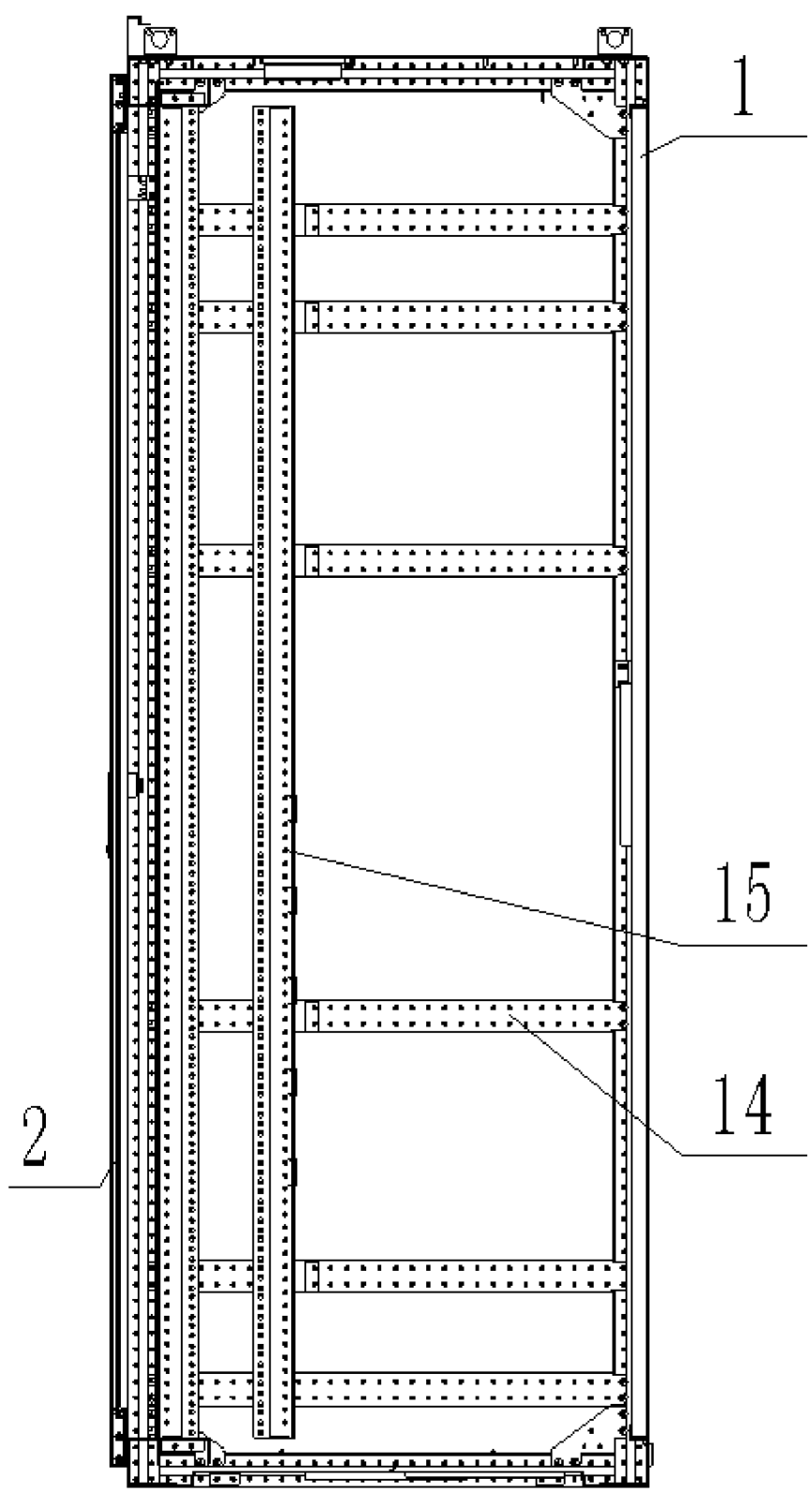
FIG. 5 is a schematic structural diagram of a cabinet in the present application.
Figure 6:
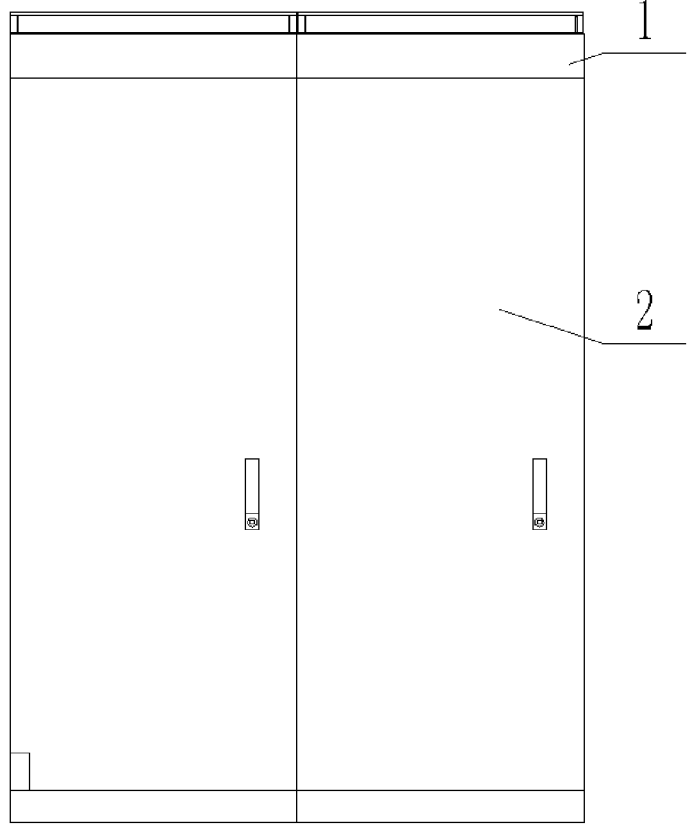
FIG. 6 is a front view of the present application.

With reference to FIGS. 1-6, the present application provides a gas insulated substation (GIS) cabinet for precise air supply control, including:

a cabinet body 1, where cabinet doors 2 are arranged on one side of the cabinet body 1, a sealing mechanism is arranged between a frame of the cabinet doors 2 and a frame of the cabinet body 1, a supporting mechanism is arranged in the cabinet body 1, a plurality of guiding mechanisms are fixedly connected with the cabinet body 1 inside along a vertical direction at equal intervals, different electronic components 3 are respectively arranged in the guiding mechanisms, and the guiding mechanisms and the electronic components 3 are connected with the supporting mechanism by bolts;

an air inlet device, where the air inlet device includes a communicated pipeline 4, a top of the communicated pipeline 4 is provided with an air inlet mechanism, a bottom of the air inlet mechanism is communicated with the top of the communicated pipeline 4, the air inlet mechanism is communicated with an external air conditioner, and a bottom of the communicated pipeline 4 is provided with a filter mechanism;

an air collecting device arranged at a bottom of an inner cavity of the cabinet body 1;

two air outlet devices respectively arranged on both sides of a bottom of the cabinet body 1.

According to the application, by changing the mechanical air supply direction, the air is supplied from an upper part of the GIS cabinet, and the delivered cold air directly contacts the electronic components 3 generating more heat, so that the heat loss is reduced and the cold air is not prone to short flow. When entering the cabinet from the air supply outlet, the cold air keeps a high flow rate to avoid dew condensation. Through upper air inlet and lower air exhaust, the temperature of electronic components 3 in the cabinet are quickly reduced by convection heat transfer under the condition that the temperature in the cabinet is too high, and dew condensation is prevented, thus reducing the running time of the air conditioner in the state of high energy consumption and ensuring the safe and stable operation of the equipment in the cabinet. The air inlet device is connected with the indoor side air outlet window of the air conditioning unit, and the air outlet devices directly lead to the room. The air outlet devices have the function of preventing mosquitoes and other small animals from entering. The electronic components 3 are merging unit, bus intelligent terminal, bus measurement and control and other components. The circuit boards of electronic components 3 are arranged at intervals along a vertical direction, and their positions may be adjusted along the vertical direction. The electronic components 3 are respectively installed on the supporting mechanism by bolts, so that the circuit boards are suspended and the heat dissipation effect is enhanced. The air collecting device makes the air in the cabinet body 1 circulate more quickly, and makes the heat generated by the electronic components 3 evaporate quickly.

In an embodiment, the air inlet mechanism includes an air inlet pipeline 5, one end of the air inlet pipeline 5 is sleeved outside the communicated pipeline 4, and an outer wall of an air outlet end of the air inlet pipeline 5 is fixedly connected with a fixing ring 6, and an outer wall of a top of the cabinet body 1 is fixedly connected with a connecting ring 7 matching with the fixing ring 6. The fixing ring 6 is connected with the connecting ring 7 by bolts, and the other end of the air inlet pipeline 5 is communicated with the external air conditioner.

In an embodiment, a sealant is arranged between the fixing ring 6 and the connecting ring 7.

The air inlet pipeline 5 is connected with the cabinet body 1 in a plug-in manner. The communicated pipeline is prepared first, and then the air inlet pipeline 5 is installed. This connection method has the characteristics of safety sealing, preventing air from leaking out, saving materials and enhancing high pressure bearing capacity. The air inlet pipeline 5 is made of stainless steel, and the sealant (such as neutral glass glue) is applied to joints such as felling, rivet seam and flange flanging corners. Before applying the sealant, dust and oil stain should be removed.

In an embodiment, the filter mechanism includes a filter cylinder 8, a top of the filter cylinder 8 is fixedly connected to an outer wall of a top opening of the inner cavity of the cabinet body 1, an inner wall of the filter cylinder 8 is fixedly connected with a filter screen 9, and a bottom of the filter cylinder 8 is detachably connected with a first louver 10, the filter cylinder 8 is designed as an Acrylonitrile Butadiene Styrene (ABS) anti-condensation double-layer adjustable louver.

The filter screen 9 prevents dust from entering the cabinet body 1 and prevents the electronic components 3 from short circuit.

In an embodiment, the air collecting device includes an air collecting plate 11, where a side wall of the air collecting plate 11 is fixedly connected with an inner wall of the cabinet body 1, a top surface of the air collecting plate 11 is provided with an air collecting hole, a bottom surface of the air collecting plate 11 is fixedly connected with an air collecting pump 12, and the air collecting plate 11 is communicated with the air collecting hole.

In an embodiment, the air outlet devices include second louvers 13, two sides of the bottom of the cabinet body 1 are respectively provided with an air outlet hole, the second louvers 13 are fixedly connected to the inner walls of the air outlet holes, and the second louvers 13 are designed as sealable louvers.

In an embodiment, the supporting mechanism includes a plurality of horizontal supports 14, a plurality of horizontal supports 14 are fixedly connected to two opposite inner walls of the cabinet body 1 at equal intervals in a vertical direction. The side surfaces of the horizontal supports 14 located on a same side are connected with the vertical supports 15 by bolts, and the guiding mechanisms and the electronic components 3 are respectively connected with the vertical supports 15 by threads. The horizontal supports 14 and the vertical supports 15 are respectively provided with a plurality of threaded holes.

Horizontal supports 14 and vertical supports 15 are fixed on the inner wall of the cabinet body 1 by combining welding seam and bolts. The connection between the guide mechanisms and electric components and the vertical supports uses bolts to connect with threaded holes on the vertical supports and this connection has advantages of simple construction processing, easy assembly and disassembly and downward layout of electric components 3 in sequence.

In an embodiment, the guiding mechanism includes a bidirectional air deflector 16 and a directional fan 17. Two ends of the bidirectional air deflector 16 are detachably connected with two vertical supports 15 by bolts, and two ends of the directional fan 17 are detachably connected with two vertical supports 15 by bolts. The directional fan 17 is located below the bidirectional air deflector 16, and electronic components 3 are arranged between the directional fan 17 and the bidirectional air deflector 16. The circuit boards on the electronic components 3 is detachably connected with the two vertical supports by bolts.

In an embodiment, an outer wall of the bidirectional air deflector 16 is configured as a frosted surface, and thermal conductive silicone pads are also set between the circuit boards of the electronic components 3 and the vertical supports.

The thermal conductive silicone pads fix the electronic components 3 and have many functions such as high thermal conductive efficiency, electrical insulation, shock-proof and puncture-proof, etc. The high temperature-resistant wire Q/TST-DL-001 is fixed with the thermal conductive silicone adhesive tape, so the long service life is ensured. The bidirectional air deflector 16 makes the cooling air at the air inlet and outlet flow to heating elements to the maximum extent, and at the same time ensures the rapid heat dissipation. The frosted surface of the bidirectional air deflector plate prevents condensation from backflowing. The directional fan 17 is arranged below the heating elements to speed up air circulation in the cabinet body 1.

According to the application, through upper air inlet and lower air exhaust, the temperature of the electronic components 3 in the cabinet is quickly reduced through convection heat transfer under the condition that the temperature in the cabinet body 1 is too high, and condensation is prevented, thereby reducing the continuous running time of the air conditioner in a high energy consumption state and ensuring the safe and stable operation of the equipment in the cabinet.

An inner layer of the air inlet pipeline 5 is equipped with an automatic monitoring instrument to monitor the air supply temperature and humidity, and the air outlet hole is connected with an air exhaust duct. Inner and outer layers of the exhaust duct are made of specially modified impact-resistant polypropylene-block copolymer (PP-B) resin, and a middle layer changes the density and microstructure of the pipe by adding noise-reducing and sound-absorbing materials, so as to absorb audible and sound waves and prevent sound waves from coming out. As the pipe is made of specially modified impact-resistant PP-B resin, it has all the advantages of ordinary plastic drainage pipes, and also has the characteristics of "impact resistance (impact performance is as good as that of cast iron pipes), high temperature resistance, long service life (with ability for discharging hot water at 95° C. for a long time), noise reduction and sound reduction.

In an embodiment, the sealing mechanism includes a rubber tube 18, a side wall of the frame of the cabinet body 1 is provided with an annular groove in a rectangular structure, the rubber tube 18 is arranged in the annular groove, the rubber tube 18 is arranged in an annular structure, an inner wall of the top of the cabinet body 1 is fixedly connected with a sealing air pump 19, the sealing air pump 19 is communicated with the rubber tube 18, and an outer wall of the rubber tube 18 at the bottom of the cabinet body 1 is communicated with an air outlet pipe 20. The air outlet pipe 20 passes through an inner wall of the annular groove and communicates with the inner cavity of the cabinet body 1. An aperture of the air outlet pipe 20 is much smaller than that of communicating part of the sealing air pump 19 and the rubber tube 18. Sides of each cabinet door 2 is fixedly connected with a sealing ring 21 and the sealing ring 21 is matched with the annular groove.

Gas is introduced into the rubber tube 18 through the sealing air pump 19, so that the rubber tube 18 expands and fills the annular groove, thus further enhancing the airtightness, and avoiding a situation that a rubber sealing strip conventionally arranged is hardened and reduces the airtightness due to long-term service.

In the description of the present application, it should be understood that directions or positional relationships indicated by the terms "longitudinal", "transverse", "upper", "lower", "front", "rear", "left", "right", "vertical", "horizontal", "top", "bottom", "inside" and "outside" are based on directions or positional relationships of drawings and are only used for describing the present application, rather than indicating or implying that the devices or elements must be in designated directions, or configured or operated in designated directions so that they cannot be understood as the limitation of this application.

The above-mentioned embodiments only describe the preferred mode of the application, but do not limit the scope of the application. On the premise of not departing from the design spirit of the application, all kinds of modifications and improvements made by ordinary technicians in the field to the technical scheme of the application shall fall within the scope of protection determined by the claims of the application.

What is claimed is:

1. A gas insulated substation (GIS) cabinet for precise air supply control, comprising:

a cabinet body, wherein cabinet doors are arranged on one side of the cabinet body, a sealing mechanism is arranged between a frame of each of the cabinet doors and a frame of the cabinet body, a supporting mechanism is arranged in the cabinet body, a plurality of guiding mechanisms are fixedly connected with the cabinet body inside at equal intervals along a vertical direction, different electronic components are respectively arranged in the guiding mechanisms, and the guiding mechanisms and the electronic components are connected with the supporting mechanism by bolts;

an air inlet device, wherein the air inlet device comprises a communicated pipeline, a top of the communicated pipeline is provided with an air inlet mechanism, a bottom of the air inlet mechanism is communicated with the top of the communicated pipeline, the air inlet mechanism is communicated with an external air conditioner, and a bottom of the communicated pipeline is provided with a filter mechanism;

an air collecting device arranged at a bottom of an inner cavity of the cabinet body; and two air outlet devices respectively arranged on two opposite sides of a bottom of the cabinet body;

wherein the air inlet mechanism comprises an air inlet pipeline, one end of the air inlet pipeline is sleeved outside the communicated pipeline, an outer wall of an air outlet end of the air inlet pipeline is fixedly connected with a fixing ring, an outer wall of a top of the cabinet body is fixedly connected with a connecting ring matched with the fixing ring, the fixing ring is connected with the connecting ring by second bolts, and another end of the air inlet pipeline is communicated with the external air conditioner.

2. The GIS cabinet for precise air supply control according to claim 1, wherein a sealant is arranged between the fixing ring and the connecting ring.

3. The GIS cabinet for precise air supply control according to claim 1, wherein the filter mechanism comprises a filter cylinder, a top of the filter cylinder is fixedly connected to an outer wall of a top opening of the inner cavity of the cabinet body, an inner wall of the filter cylinder is fixedly connected with a filter screen, a bottom of the filter cylinder is detachably connected with a first louver, and the first louver is arranged as an Acrylonitrile Butadiene Styrene (ABS) anti-condensation double-layer adjustable louver.

4. The GIS cabinet for precise air supply control according to claim 3, wherein the air collecting device comprises an air collecting plate, a side wall of the air collecting plate is fixedly connected with an inner wall of the cabinet body, a top surface of the air collecting plate is provided with an air collecting hole, and a bottom surface of the air collecting plate is fixedly connected with an air collecting pump, and the air collecting pump is communicated with the air collecting hole.

5. The GIS cabinet for precise air supply control according to claim 1, wherein the two air outlet devices comprise second louvers, the two opposite sides of the bottom of the cabinet body are respectively provided with air outlet holes, the second louvers are fixedly connected to inner walls of the air outlet holes, and the second louvers are configured as sealable louvers.

6. The GIS cabinet for precise air supply control according to claim 5, wherein the supporting mechanism comprises a plurality of horizontal supports, the horizontal supports are fixedly connected to two opposite inner walls of the cabinet body at equal intervals in the vertical direction, and lateral surfaces of the horizontal supports located on a same side are connected with a corresponding one of two vertical supports by third bolts; the guiding mechanisms and the electronic components are respectively connected with the two vertical supports by threads, and a plurality of threaded holes are respectively provided on the horizontal supports and the two vertical supports.

7. The GIS cabinet for precise air supply control according to claim 6, wherein each of the guiding mechanisms comprises a bidirectional air deflector and a directional fan, wherein two opposite ends of the bidirectional air deflector are detachably connected with the two vertical supports by fourth bolts; two opposite ends of the directional fan are detachably connected with the two vertical supports by fifth bolts; the directional fan is located below the bidirectional air deflector; the electronic components are arranged between the directional fan and the bidirectional air deflector; and circuit boards on the electronic components are detachably connected with the two vertical supports by sixth bolts.

8. The GIS cabinet for precise air supply control according to claim 7, wherein an outer wall of the bidirectional air deflector is designed as a frosted surface, and thermal conductive silicone pads are also set between the circuit boards of the electronic components and the two vertical supports.

9. The GIS cabinet for precise air supply control according to claim 1, wherein the sealing mechanism comprises a rubber tube, a side wall of the frame of the cabinet body is provided with an annular groove in a rectangular structure, the rubber tube is arranged in the annular groove, the rubber tube is arranged in an annular structure, an inner wall of the top of the cabinet body is fixedly connected with a sealing air pump, the sealing air pump is communicated with the rubber tube, and an outer wall of the rubber tube at the bottom of the cabinet body is communicated with an air outlet pipe; the air outlet pipe penetrates through an inner wall of the annular groove and is communicated with the inner cavity of the cabinet body, an aperture of the air outlet pipe is smaller than an aperture of a communicating part of the sealing air pump and the rubber pipe, and a side of each of the cabinet doors is fixedly connected with a sealing ring matched with the annular groove.

\* \* \* \* \*